(12) United States Patent  
Fung

(10) Patent No.: US 9,756,981 B2  
(45) Date of Patent: Sep. 12, 2017

(54) TOASTER OVEN

(71) Applicant: CONAIR CORPORATION, Stamford, CT (US)

(72) Inventor: Kam Fai Fung, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 353 days.

(21) Appl. No.: 13/960,869

(22) Filed: Aug. 7, 2013

(65) Prior Publication Data

US 2015/0040774 A1    Feb. 12, 2015

(51) Int. Cl.
*A47J 37/00* (2006.01)
*A47J 37/06* (2006.01)
*A47J 37/08* (2006.01)

(52) U.S. Cl.
CPC ....... *A47J 37/0635* (2013.01); *A47J 37/0623* (2013.01); *A47J 37/0807* (2013.01)

(58) Field of Classification Search
CPC . A47J 37/0635; A47J 37/0629; A47J 37/0623
USPC ....... 99/389, 390, 385, 333, 329 R; 219/397, 219/398, 413, 461
See application file for complete search history.

(56) References Cited

U.S. PATENT DOCUMENTS

| | | | |
|---|---|---|---|
| 4,345,145 A | | 8/1982 | Norwood |
| 4,455,319 A | * | 6/1984 | Clark ............................ 426/233 |
| 5,517,005 A | * | 5/1996 | Westerberg et al. .......... 219/685 |
| 5,694,831 A | * | 12/1997 | Haroun ............... A47J 37/0623 |
| | | | 219/400 |
| D412,637 S | | 8/1999 | Piret |
| 6,781,097 B2 | | 8/2004 | Graff |
| D521,799 S | | 5/2006 | Ledingham et al. |
| D575,979 S | | 9/2008 | Borin |
| D587,959 S | | 3/2009 | Hensel |
| D638,249 S | | 5/2011 | Ryan et al. |
| D658,439 S | | 5/2012 | Curtis et al. |
| D662,759 S | | 7/2012 | Blacken et al. |
| 8,573,117 B2 | * | 11/2013 | Shealy et al. .................. 99/389 |
| 8,669,500 B2 | * | 3/2014 | Hensel et al. ................. 219/483 |
| 2005/0236389 A1 | | 10/2005 | Goranson |
| 2010/0006561 A1 | | 1/2010 | Hensel et al. |

* cited by examiner

*Primary Examiner* — Reginald L Alexander

(74) *Attorney, Agent, or Firm* — Grogan, Tuccillo & Vanderleeden, LLP

(57) ABSTRACT

The toaster oven of the present invention includes a housing having an internal heating compartment, an upper heating element and a lower heating element. The upper heating element and the lower heating element are independently controllable between zero power and full power in dependence upon a user-selected operating mode.

8 Claims, 3 Drawing Sheets

TOASTER OVEN

FIELD OF THE INVENTION

The present invention relates to toaster ovens and, more particularly, to a toaster oven that is selectively operable in a variety of modes.

BACKGROUND OF THE INVENTION

Various toaster ovens exist for heating and cooking a variety of food items. For example, existing toaster ovens are used for toasting bagels, heating sandwiches, baking desserts, broiling meats and reheating leftovers. Heating and cooking these food items is often accomplished by the operation of upper and lower heating elements within the toaster oven, and temperature control and time control over these heating elements through a user interface or control panel.

While existing toaster ovens are generally suitable for what is regarded as ordinary performance, there is room for improvement in terms of ease of use, compactness, and performance, including temperature and time control of the upper and lower heating elements. In particular, existing toaster ovens are only particularly suited to toast or bake a limited certain food items and are only temperature and time controllable to a limited extent.

SUMMARY OF THE INVENTION

It is an object of the present invention to provide a toaster oven.

It is an object of the present invention to provide a toaster oven having multiple pre-programmed operating modes.

It is an object of the present invention to provide a toaster oven that has preset and adjustable temperature and cook times.

It is an object of the present invention to provide a toaster oven that is compact.

It is an object of the present invention to provide a toaster oven having a digital display and controls.

It is an object of the present invention to provide a toaster oven having heating elements that are independently controllable.

The toaster oven of the present invention includes a housing having an internal heating compartment, an upper heating element and a lower heating element. The upper heating element and the lower heating element are independently controllable between zero power and full power in dependence upon a user-selected operating mode.

DETAILED DESCRIPTION OF THE PREFERRED EMBODIMENTS

Figure 1:
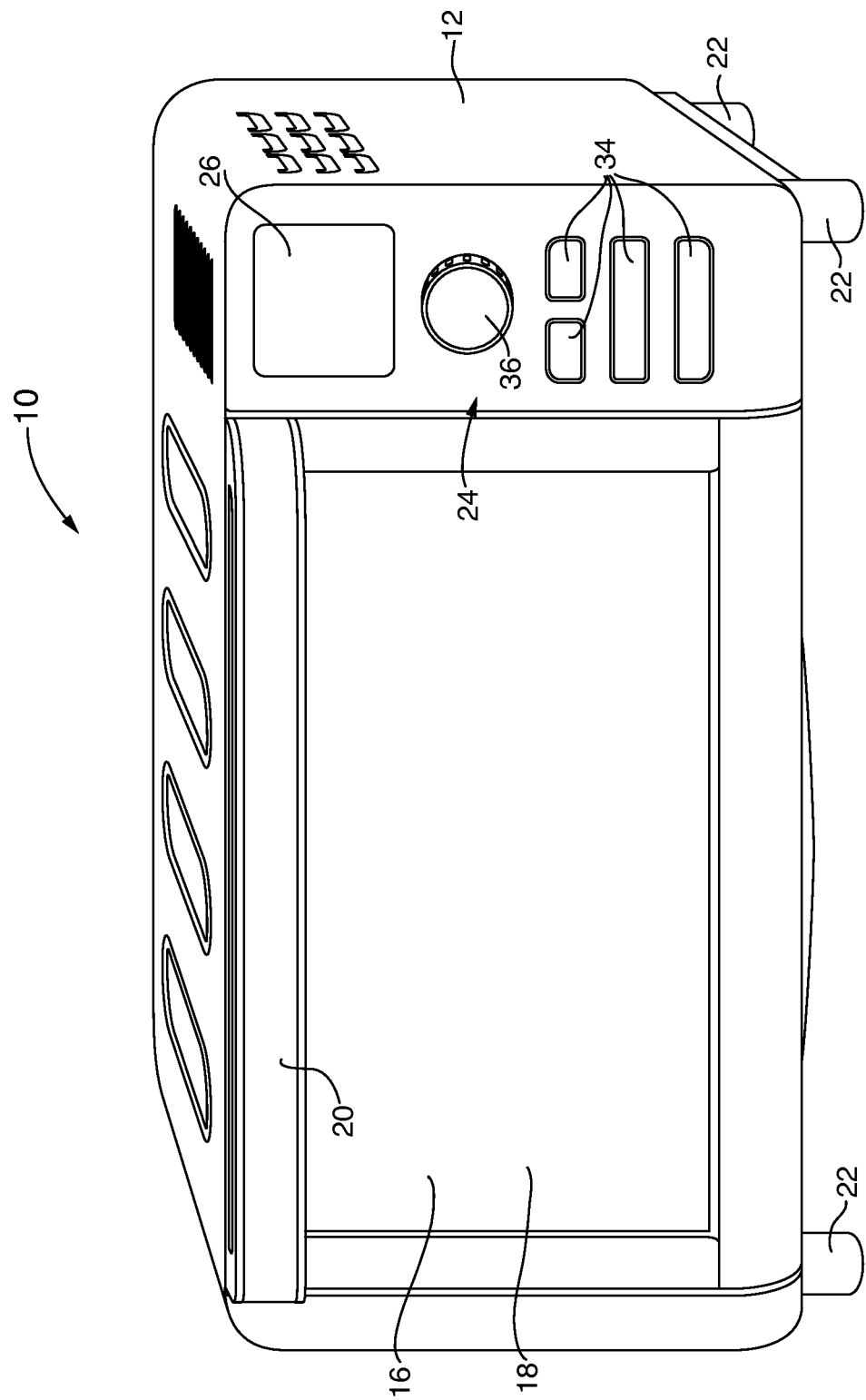
FIG. 1 is a perspective view of a toaster oven in accordance with an embodiment of the present invention.

Referring to FIG. 1, a toaster oven 10 is shown. The toaster oven 10 includes a thermally insulated housing 12 that defines an internal heating compartment 14. The compartment 14 may be accessed through a door 16 having a transparent front panel 18. In an embodiment, the door 16 is pivotally connected to the housing 12 at a lower edge thereof. As shown therein, the door 16 also has a handle 20 allowing a user to open the door 16 to provide access to the compartment 14. A plurality of feet 22 support the housing 12 in spaced relation to a countertop or other surface.

As further shown in FIG. 1, the front of the housing 12 includes a user interface 24 comprising a graphic display 26, such as a LCD, and an array of user controls, as discussed hereinafter.

Figure 2:
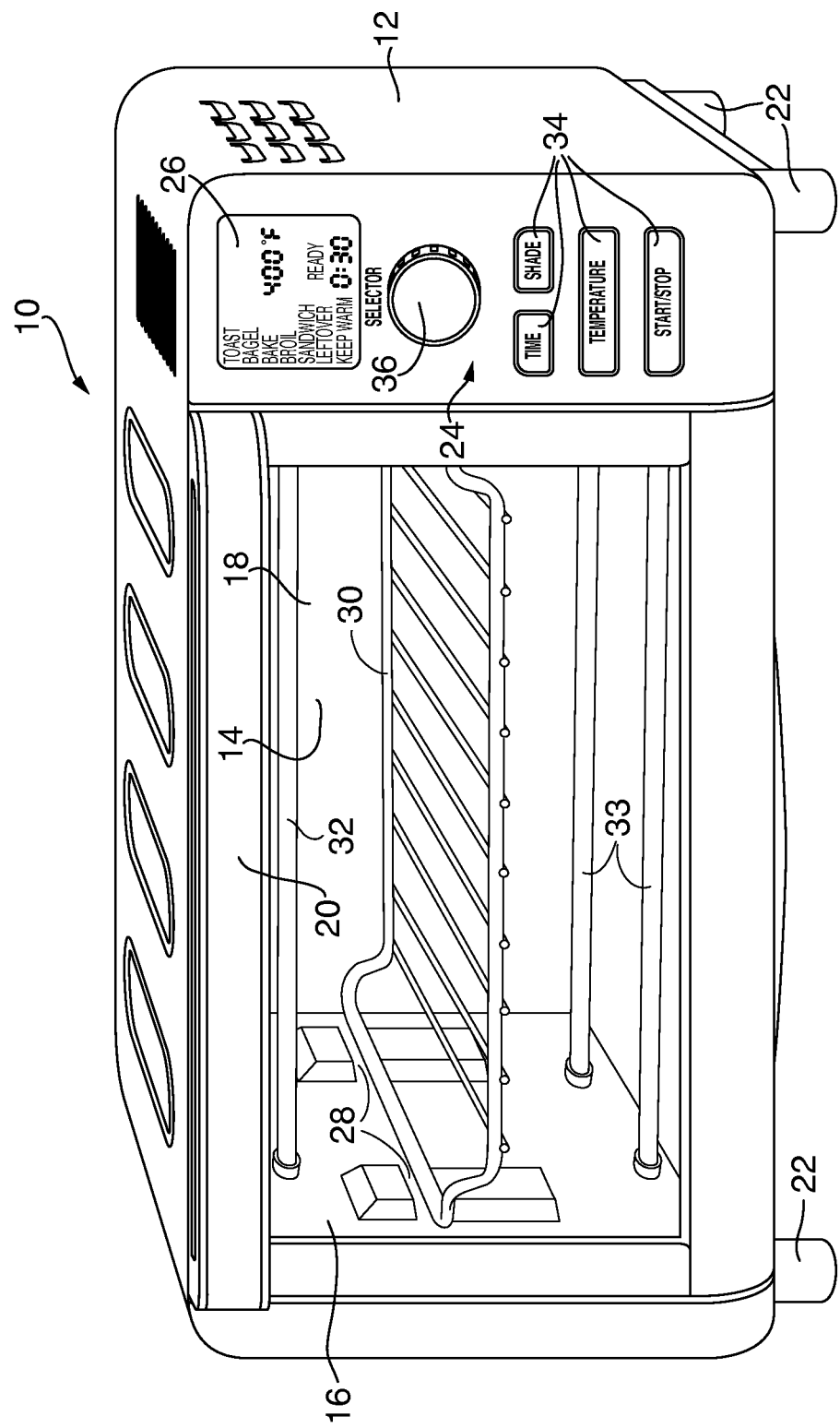
FIG. 2 is a perspective view of the toaster oven of FIG. 1 illustrating internal components thereof.

As best shown in FIG. 2, the internal compartment 14 includes one or more pairs of opposed slots 28 for slidably receiving one or more removable racks 30. The internal compartment 14 is heated by four tubular heating elements 32, 33 configured to produce radiant heat. Two heating elements 32 are located adjacent to the ceiling or top of the compartment 14 and two heating elements 33 are located along the floor or bottom of the compartment 14. In an embodiment, the tubular heating elements 32, 33 are Calrod® heaters, such as stainless steel Calrod® heaters, although any other type of heating element known in the art, such as quartz, tungsten, halogen, etc., may also be utilized without departing from the broader aspects of the present invention. In the preferred embodiment the top heating elements 32 are capable of operating at 700 watts (full power). Likewise, in the preferred embodiment, the bottom heating elements 33 are also capable of operating at 700 watts (full power).

Figure 3:
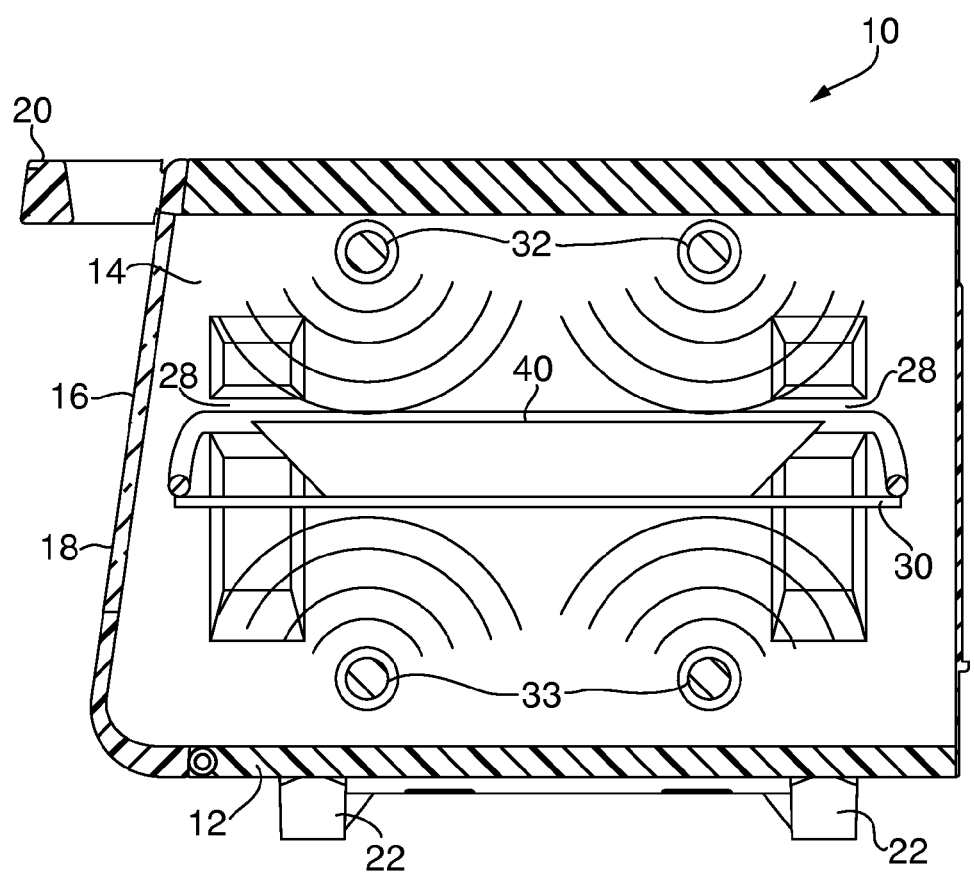
FIG. 3 is a schematic, side cross-section of the toaster over of FIG. 1.

As shown in FIG. 3, the heating elements 32, 33 are shown producing radiant heat in reference to a food item 40 within heating compartment 14.

With further reference to FIG. 2, the user interface 24 is electrically connected to, and configured to control, operation of the heating elements 32, 33. In particular, the user interface 24 includes a microprocessor (not shown) and control circuitry configured to control the heating elements 32, 33 in dependence upon a user input, and according to control algorithms stored in memory. Importantly, the upper and lower heating elements 32, 33 are independently controllable by the microprocessor and control circuitry. In particular, in a first mode, both the two upper and two lower heating elements 32, 33 may be operated at full wattage. In another mode, the upper heating elements 32 are operated at full wattage and the lower heating elements 33 are maintained in an OFF position. Conversely, in yet another mode, the upper heating element 32 is maintained in an OFF position while the lower heating elements 33 are operated at full wattage. In yet other modes, either or both of the upper and lower heating elements 32, 33 may be operated at a wattage between zero wattage (OFF) and full wattage. For example, one or both of the heating elements 32, 33 may be operated at half wattage.

In other embodiments, one or both of the heating elements 32, 33 may be operated at a wattage between zero watts and full wattage for a first portion of a cooking/heating cycle, and at another, different wattage for a second portion of a cooking/heating cycle.

As shown in FIG. 2, the user interface 24 may have buttons 34 for selecting a function, a time, a temperature or a shade, and a knob for changing the function, time, temperature or shade. For example, after depressing a time button, a user may turn the knob 36 until the desired time appears on the display 26. Similarly, after depressing the temperature button, a user may turn knob 36 until the desired temperature is shown on graphic display 26.

As alluded to above, importantly, the toaster oven 10 is capable of operating in a plurality of modes. A user may select a mode by rotating the knob 36 until the desired mode appears on the graphic display 26. In an embodiment, a user may select between, at least, the following modes: toast, bagel, sandwich, bake, broil, leftover and keep warm. In each of these modes, the microprocessor controls the upper and lower heating elements 32, 33 according to a specific control algorithm to precisely heat or cook a desired food product.

In a "toast" mode, a user may select a desired toast shade using the buttons 34 and knob 36 on the user interface 24. Once selected, both the bottom heating elements 33 and the top heating elements 32 will turn on with full wattage (700 watts top, 700 watts bottom) until the toast reaches the desired shade, after which the heating elements 32, 33 will be controlled to their "OFF" positions.

In a "bagel" mode, a user may likewise select a desired toast shade using the buttons 34 and knob 36 on the user interface 24. In contrast to the "toast" mode, however, in the "bagel" mode, the top heating elements 32 are turned on and operated at full wattage (700 watts in the preferred embodiment), while the bottom heating elements 33 are turned on and operated at half of the full wattage (350 watts in the preferred embodiment). Once the bagel reaches the shade selected, the heating elements 32, 33 will be controlled to their "OFF" positions by the control circuitry.

In a "bake" mode, a user may first select a desired temperature and time using the bottoms 34 and knob 36. In an embodiment, the default bake temperature is 350 degrees Fahrenheit, and a user may select a temperature between 160 F to 500 F. In the bake mode, the upper and lower heating elements 32, 33 are both operated at full wattage until the timer expires, at which time the heating elements 32, 33 are controlled to their "OFF" positions.

In a "broil" mode, the temperature is automatically set to 500 degrees F. A user may then utilized the knob 36 to select a desired broil time. Depressing a start button will initiate the broil cycle, which will run until expiration of the timer. In the broil mode, only the top heating elements 32 are turned "ON," at full wattage (the bottom heating elements 33 remain OFF).

In a "leftover" mode, the temperature is automatically set to 325 degrees F. and the timer is automatically set to 20 minutes. The temperature and time may, however, be adjusted by a user by utilizing the buttons 34 and knob 36 on the user interface 24. In the leftover mode, both the top and bottom heating elements 32, 33 are activated and operated at full wattage.

In a "sandwich" mode or "open-faced sandwich" mode, the temperature is automatically set to 400 degrees F. and 15 minutes time. Again, a user may adjust the temperature and time through the user interface 24. In any event, however, in the sandwich mode, the bottom heating elements 33 are operated at full wattage (700 watts in the preferred embodiment) while the top heating elements 32 are operated at half wattage (350 watts in the preferred embodiment).

Finally, in a "keep warm" mode, the temperature is automatically set at 160 degrees F. A user may then select the time of operation through the control interface 24. In the keep warm mode, the bottom heating elements 33 are operated at full wattage and the top heating elements 32 are maintained in their "OFF" positions.

As noted above, the toaster oven 10 of the present invention may be operated using both preset and user-adjustable temperature and cook times. In the preset modes, the toaster oven 10 is pre-programmed to deliver power to the heating elements in dependence upon the type of food being heated.

As will be readily appreciated, independent control of the upper and lower heating elements 32, 33 allows a user to more precisely tailor a cooking/heating cycle to the type of food item placed within the heating compartment 14, resulting in better tasting and looking food. In addition, control over the heating elements allows the toaster over 10 to be utilized to heat or cook food items that would normally not be well suited to cooking in conventional toaster ovens.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A toaster oven, comprising:
   a housing having an internal heating compartment;
   at least one upper heating element adjacent to a top of said heating compartment, said at least one upper heating element being operable at a first wattage between zero power and full power;
   at least one lower heating element adjacent to a floor of said heating compartment, said second heating element being operable at a second wattage between zero power and full power;
   a user interface for selecting one of a plurality of preset cooking modes to be automatically carried out by said toaster oven; and
   a control unit in communication with said upper heating element, said lower heating element and said user interface, said control unit being configured to control said upper heating element and said lower heating element in dependence upon a selected preset cooking mode;
   wherein in at least one of said preset cooking modes, said control unit is configured to selectively vary an operational time period for said upper heating element and lower heating element, such that one of said wattage of said upper heating element and lower heating element is selectively varied from above zero wattage to below maximum wattage during a cooking operation; and
   wherein within said preset cooking modes, said operational time period and said wattage of said upper heating element are controllable independent of said operational time period and said wattage of said lower heating element by a user through said user interface.

2. The toaster oven of claim 1, wherein:
   said first wattage is the same as said second wattage.

3. The toaster oven of claim 1, wherein:
   said first wattage is different from said second wattage.

4. The toaster oven of claim 1, wherein:
   said first wattage is approximately halfway between zero power and full power; and
   said second wattage is full power.

5. The toaster over of claim 1, wherein:
   said second wattage is approximately halfway between zero power and full power; and
   said first wattage is full power.

6. The toaster oven of claim 1, wherein:
   said at least one upper heating element is two upper heating elements; and
   said at least one lower heating element is two lower heating elements.

7. The toaster over of claim 1, wherein:
said heating elements are tubular heating elements.

8. A toaster oven, comprising:
a housing having an internal heating compartment;
an upper heating element; and
a lower heating element, said upper heating element and said lower heating element being independently controllable between zero power and full power; and
a user interface for selecting one of a plurality of preset cooking modes and for manually controlling said upper heating element and said lower heating element;
wherein in said preset cooking modes, a control unit of said toaster over is configured to automatically control said upper heating element and said lower heating element according to wattages and operational time periods stored in memory and corresponding to said preset cooking mode;
wherein within said preset cooking modes, said wattages and said operational time periods of said upper heating element and said lower heating element are manually and individually adjustable by a user through said user interface for providing precise control over a cooking operation; and
wherein in at least one of said preset cooking modes at least one of said upper heating element and lower heating element is operable at a first power level selectively varied from above zero wattage to below maximum wattage for a first predetermined period of time, and operable at a second power level for a second predetermined period of time, said second power level being different than said first power level within a common cooking period.

* * * * *